M. Merk,
Fly Trap.
No. 105,963. Patented Aug. 2, 1870.
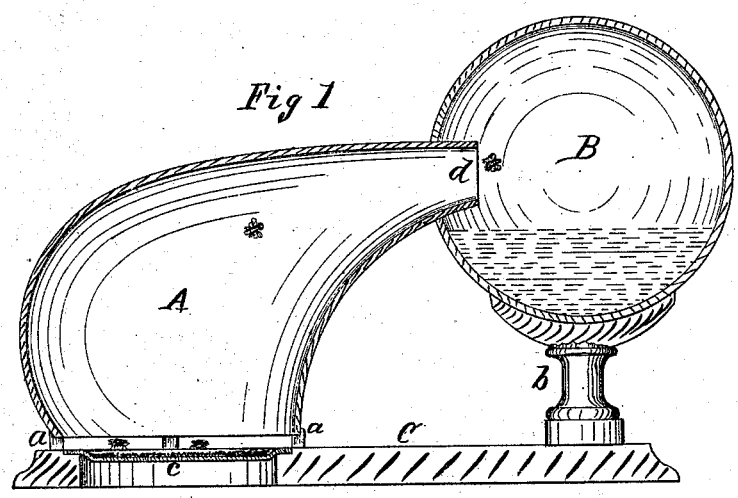
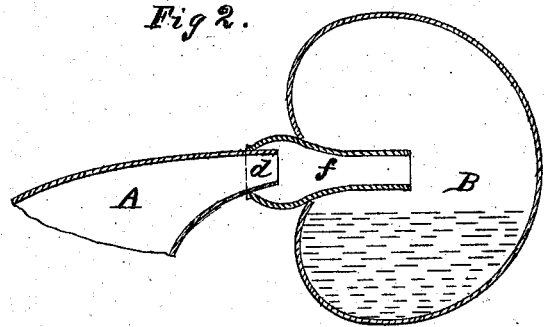
Witnesses:
F. H. Clement
Wm. S. Loughborough
Inventor
Modest Merk

United States Patent Office.

MODEST MERK, OF ROCHESTER, NEW YORK.

Letters Patent No. 105,963, dated August 2, 1870.

---

IMPROVEMENT IN FLY-TRAP.

---

The Schedule referred to in these Letters Patent and making part of the same.

---

I, MODEST MERK, of Rochester, in the county of Monroe and State of New York, have invented certain Improvements in "Apparatus for Catching Flies," of which the following is a specification.

My invention consists in the combination with a transparent vessel, containing water or other liquid, poisonous or otherwise, of a funnel-shaped conductor, into which the insects are attracted by suitable baits.

In the drawing—

Figure 1 is a vertical section of my invention.

Figure 2 shows a modification of the device.

The funnel-shaped conductor, A, rests, at its base, upon two or more cleats or projections, $a$, provided either upon the vessel or platform C, the space beneath it being just sufficient to admit flies or other insects to the interior.

The upper portion of this conductor is tapered gradually toward the mouth, $d$, which is at one side, as shown, the vessel being formed with an easy curve, by which the insect is readily led in its flight through the mouth $d$ into the globe B.

The globe B rests upon a suitable pedestal attached to the platform C, and may contain water or other liquid, with or without a quantity of poison or spirituous liquor.

Underneath the vessel A I provide a plate, $c$, which is made removable, for the purpose of cleansing, and upon which a quantity of saccharine matter or other suitable bait is placed.

The operation of this device is as follows:

The flies, being attracted by the sweetmeats, crawl under the edge of the vessel A, and, in attempting to leave, rise upon the wing toward the light to the upper portion of the vessel, and, there being no other egress, are led through the mouth $d$ into the globe B. There, after flying around a short time, they either become exhausted, and drop into the liquid, or are poisoned or intoxicated by it. It is not found in practice that over one per cent. of those entering the vessel A escape in any manner.

In fig. 2 I have shown another form of apparatus, operating upon the same principle. The vessel B is heart-shaped, and, instead of arranging the mouth of A to enter B directly, I provide the bulbed tube $f$, projecting some distance into the latter, and receiving the mouth of A at the rear.

It will be observed that, when the insects fly around in the vessel B, the curve of its sides is such as to lead them away from the mouth of $f$, and the difficulty of finding their way back into A is increased by the addition of the tube $f$.

The forms of the vessels A and B, herein shown, are not essential to the operation of the device, but such forms are preferred, for reasons above stated.

It is also preferable that the vessel A be somewhat enlarged just above the lower edge, as shown, to increase the difficulty of obtaining egress at the bottom. Both vessels are readily removable for the purpose of cleansing and emptying.

In using this apparatus it is found advantageous to so place it in a room that the globe B shall be toward a window or open door, whereby the insects in the vessel A, by seeking the light, are led into the globe. Any transparent or semi-transparent material may be used in the construction of the apparatus, and the sustaining platform C may be made in a neat, substantial manner, thus forming an ornamental article.

What I claim as my invention is—

1. The funnel-shaped conductor A, in combination with the vessel B, when arranged to operate substantially as described.

2. In combination with the conductor A and vessel B, the removable bait-pan $c$, as and for the purposes set forth.

MODEST MERK.

Witnesses:
DANL. L. JOHNSTON,
F. H. CLEMENT.